United States Patent [19]

Wakabayashi et al.

[11] 4,248,612
[45] Feb. 3, 1981

[54] APPARATUS FOR CLEANING AND RECOVERING POWER FROM BLAST FURNACE EXHAUST GAS

[75] Inventors: Akira Wakabayashi, Kobe; Shoichi Watanabe, Akashi; Koji Sato, Midorigaokanishi; Hiroyuki Kohama, Daito; Katsumi Sakuma, Akashi, all of Japan

[73] Assignee: Kobe Steel, Limited, Kobe, Japan

[21] Appl. No.: 20,177

[22] Filed: Apr. 12, 1979

[51] Int. Cl.³ ............................................. B01D 50/00
[52] U.S. Cl. ..................................... 55/350; 55/432; 55/474; 55/479; 55/99; 266/157
[58] Field of Search ......................... 55/96–99, 55/474, 479, 218, 350, 390, 432; 34/242; 432/242; 422/216, 219; 266/155–159

[56] References Cited

U.S. PATENT DOCUMENTS

| 1,728,130 | 9/1929 | Mathesius et al. | 266/157 |
| 2,131,031 | 9/1938 | Avery | 266/159 |
| 2,833,838 | 5/1958 | Berg | 422/216 |
| 3,731,910 | 5/1973 | Butler | 266/157 |
| 3,883,324 | 5/1975 | Balla et al. | 266/157 |
| 4,012,210 | 3/1977 | Morris | 55/99 |
| 4,033,117 | 7/1977 | Smith | 55/479 |
| 4,052,042 | 10/1977 | Hegemann et al. | 266/159 |
| 4,149,858 | 4/1979 | Noack et al. | 55/99 |

FOREIGN PATENT DOCUMENTS

| 2552298 | 8/1976 | Fed. Rep. of Germany | 55/79 |
| 2737393 | 3/1979 | Fed. Rep. of Germany | 266/144 |

*Primary Examiner*—Bernard Nozick
*Attorney, Agent, or Firm*—Oblon, Fisher, Spivak, McClelland & Maier

[57] ABSTRACT

Energy or power is recovered from blast furnace exhaust gas by passing it through coarse dust removing mechanism, and then passing the gas through a dry moving bed type dust collecting mechanism for final dust removal, thereafter the blast furnace exhaust gas is supplied to a top pressure recovery turbine.

4 Claims, 7 Drawing Figures

APPARATUS FOR CLEANING AND RECOVERING POWER FROM BLAST FURNACE EXHAUST GAS

BACKGROUND OF THE INVENTION

1. Field of the Invention

This invention relates to a process of and an apparatus for recovering energy or power from top gas exhausted from a blast furnace, and more particularly to an improvement in a process of and an apparatus for recovering energy or power from said top gas exhausted from a blast furnace while a dry moving bed type dust collector is used for final dust removal from said exhaust gas.

2. Description of the Prior Art

In compliance with the current uplift of consensus for saving energy, there have been proposed and used various types of apparatus and processes which are intended for recovering energy or power from the top gas exhausted from blast furnaces through driving a gas turbine by the energy possessed by the top gas.

Usually, the top gas exhausted from blast furnace contains a large amount of dust, and it is necessary to remove this dust from the gas before the gas is fed to the gas turbine. FIG. 1 shows a typical conventional system for removing the dust from the top gas. This system has a dust catcher 2 adapted to catch and remove relatively coarse dust particles suspended in the top gas exhausted from a blast furnace 1. The gas is then delivered to a venturi scrubber (wet type dust collector) 3 and supplied to a top pressure recovery turbine 4 to drive the latter. The gas exhausted from the turbine 4 then passes through a wet type electric precipitator 5 for precipitation of dust and finally forwarded to a gas holder 6.

In this conventional system, however, the temperature of the gas entering the top pressure recovery turbine is inconveniently decreased to 40° C. or so, because of the use of the wet type dust collector (venturi scrubber). Also, the pressure drop across the wet type dust collector is as large as 2000 to 2500 mmAq. As a result, the efficiency of recovery of pressure is rendered impractically low. At the same time, the low gas temperature permits the use of only the centrifugal type turbine which has only a small efficiency. In addition, the life of the turbine blades is shortened due to a large concentration of dust which is as large as 20 mg/Nm$^3$. Further, the use of wet type dust collector inevitably necessitates the use of equipments for water disposal and drying of dusts, resulting in a considerably raised cost of installation and running cost of the system.

SUMMARY OF THE INVENTION

Under these circumstances, the present invention aims at overcoming the above mentioned problems of the prior art attributable to the use of the wet type dust collector, basically by the adoption of a dry type dust collector having an improved construction, and of an improved process.

Accordingly, the first object of the present invention provides an improved process for recovering power from blast furnace exhaust gas.

Another object of the present invention is to provide an improved apparatus for effectively recovering power from blast furnace exhaust gas.

In order to achieve the above and/or other objects of the present invention, there is set forth a first aspect of the present invention which is a process for recovering energy from blast furnace exhaust gas wherein said gas is passed through coarse dust removing means, and then passed through a dry type moving bed type dust collecting means for final dust removal with the gas thereafter being supplied to top pressure recovery turbine.

The second aspect of the present invention is an apparatus for recovering energy or power from blast furnace exhaust gas, which comprises means for removing coarse dust of blast furnace exhaust gas, means for removing fine dust of the gas after said coarse dust removal, and means for recovering energy from the gas.

The third aspect of the present invention is an apparatus according to the second aspect, which comprises a dry moving bed type dust collector having a pressure-resistant closed vessel, at least one moving bed of filtration media disposed in said vessel so as to form a passage for said final dust removal from said gas after said coarse dust removal, a gas-seal type filtration media supplying device connected to the top portion of said vessel and a gas-seal type filtration media discharging device connected to the bottom portion of said vessel, said dry moving bed type dust collector being disposed in the preceding stage to said top pressure recovery turbine.

The fourth aspect of the present invention is an apparatus according to the third aspect, wherein said filtration media in the pressure-resistant vessel has two or more moving beds arranged in the form of concentric rings.

The fifth aspect of the present invention is an apparatus according to the third aspect, wherein said filtration media in the pressure-resistant vessel has two or more moving beds arranged in the form of polygonal rings.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein:

FIG. 5b is a cross-sectional view of the dry moving type dust collector as shown in FIG. 5a.

FIG. 5c is a cross-sectional view of an alternate embodiment of the dry moving bed type dust collector as shown in FIG. 5a.

DETAILED DESCRIPTION OF THE PREFERRED EMBODIMENTS

Figure 1:
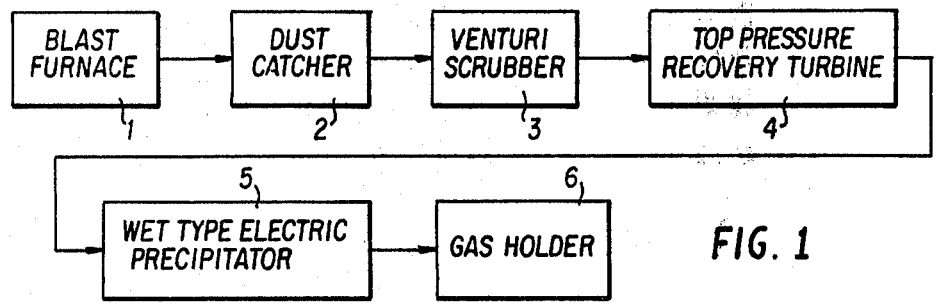
FIG. 1 is a flow sheet of a conventional process for recovering the power from blast furnace exhaust gas.
Figure 2:
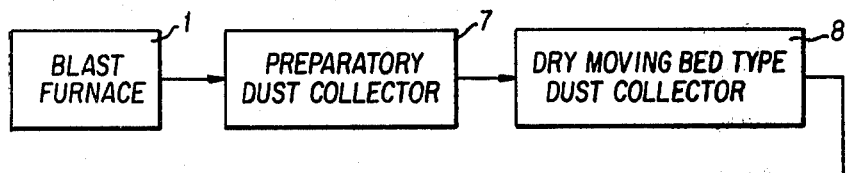
FIG. 2 is a flow sheet of a process for recovering power from blast furnace exhaust gas, in accordance with the present invention.
Figure 2:
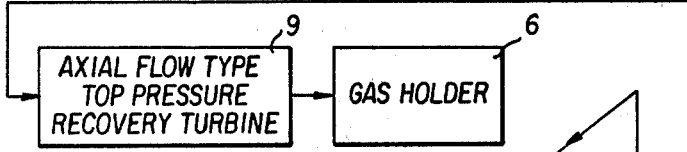

Referring to FIG. 2, a process of the present invention for recovering energy or power from blast furnace exhaust gas includes removal of coarse dust from the top or exhaust gas, exhausted from a blast furnace 1, by means of a preparatory dust collector 7 such as a dust catcher or a multicyclon, and is subjected to a final dust removal which is effected by a dry moving bed type dust collector 8. The gas is then directly fed to an axial flow type top pressure recovery turbine 9 so as to drive the latter. The gas exhausted from the turbine 9 is then directly delivered to a gas holder 6.

Figure 3:
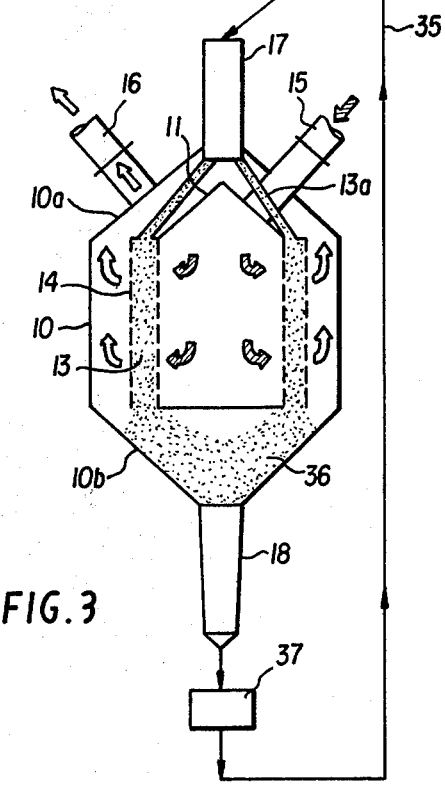
FIG. 3 is a longitudinal sectional view of an example of a dry moving bed type dust collector as used in the present invention.

As will be seen from FIG. 3, the dry moving bed type dust collector 8 has a pressure-resistant closed vessel 10 of an elongated cylindrical shape which is closed at its upper and lower ends with respective conical cover members 10a, 10b. At the center of the vessel 10, disposed is a cylindrical inner wire screen 12 of a small diameter and provided with a conical ceiling member 11 attached to the top end thereof. Also, a cylindrical outer wire screen 14 of a larger diameter is disposed around the inner wire screen 12, concentrically with the latter, and is suspended fixedly from an intermediate supporting member (not shown). The inner cylindrical wire screen 12 and an outer cylindrical wire screen 14 are adapted to define therebetween a predetermined moving bed 13 of a filtration media.

A duct 15 for supplying the blast furnace exhaust gas after coarse dust removal passes in a sealing manner through the conical surface of the upper conical cover member 10a of the vessel 10, and is connected to the conical ceiling member 11 of the inner cylindrical wire screen 12. A duct 16 for delivering the dust-free blast furnace exhaust gas is connected to a portion of the conical surface of the upper conical cover member 10a other than the portion passed by the gas supplying duct 15. The moving bed 13 of filtration media defined between the inner and other wire screens 12, 14 is connected at its upper end to a gas-seal type filtration media supplying device 17 attached to the top portion of the vessel 10, through a communication passage 13a. Also, a gas-seal type filtration media discharging device is attached to the bottom of the vessel 10.

Figure 4:
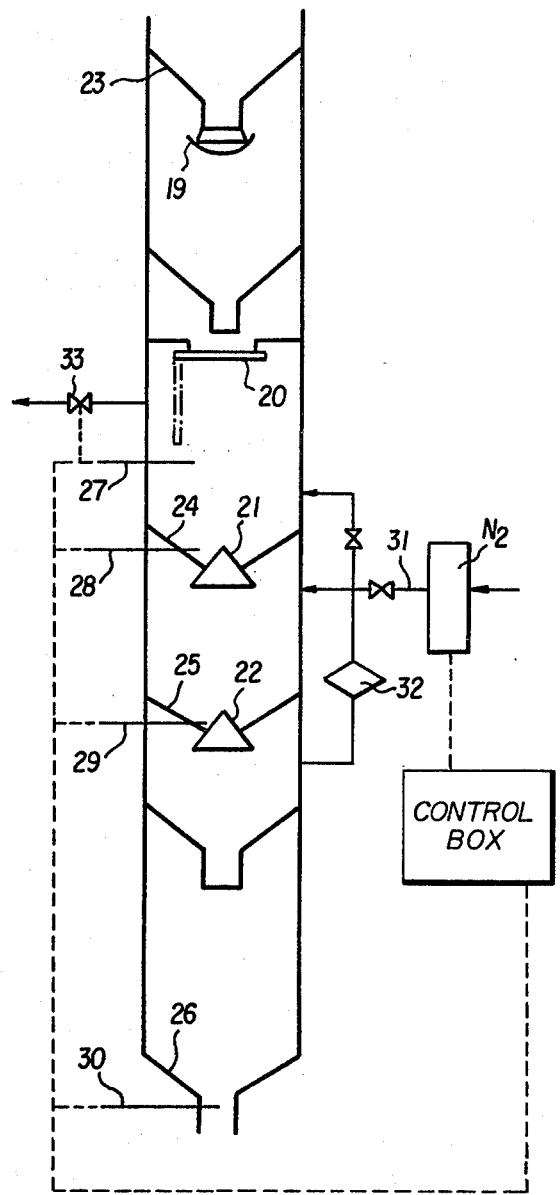
FIG. 4 is a longitudinal sectional view of a gas-seal type filtration media supplying device as used in the present invention.

A gas-seal type filtration media supplying device 17 may be, for example, a 2-bell, 1-valve seal type device as shown in FIG. 4. More specifically, this device has a cut valve 19, a damper 20, an upper conical valve 21, a lower conical valve 22, hoppers 23 to 26 and level meters 27 to 30. The valves 19,21,22 and the damper 20 are adapted to be opened and closed in accordance with the operations of the level meters 27 to 30. This device operates in the following manner.

(1) As the level of the filtration media in the hopper 26 is lowered, the level meter 30 starts to operate to open the lower conical valve 22, so that the filtration media in the hopper 25 is delivered to the hopper 26.

(2) The level meter 29 is operated as the hopper 25 is completely evacuated, so that the lower conical valve 22 is closed while the upper conical valve 21 is opened, so as to start the delivery of the filration media in the hopper 24 to the hopper 25.

(3) As the hopper 24 is completely evacuated, the level meter 28 starts to operate, so that the cut valve 19 is opened after the closing of the upper conical valve 21 and the opening of the damper 20. As a result, the filtration media in the hopper 23 is delivered to the hopper 24. Then, as the level of the filtration media in the hopper 24 is raised to a certain level, the level meter 27 is operated to close the cut valve 19, so that the supply of the filtration media from the hopper 23 is stopped and the damper 20 is closed.

The filtration media is supplied by the repetition of the above stated steps (1) to (3). During this operation of the filtration media supplying device, $N_2$ gas of the same pressure as the blast furnace exhaust gas is supplied to the space between the hoppers 24 and 25, by means of a pressure equalizing device 32 and an $N_2$ gas valve 31.

However, when the damper 20 is opened, the valve 33 is opened to relieve the pressure of $N_2$ gas in the hopper 24, so as to facilitate the opening of the damper 20. Simultaneously with the closing of the damper 20, the $N_2$ gas of the same pressure as the blast furnace exhaust gas is supplied again into the hopper 24. By so doing, the space in the hopper 25 is always filled with $N_2$ gas of the same pressure as the blast furnace exhaust gas, so that the blast furnace exhaust gas is completely prevented from leaking to the upper side through the chamber of the hopper 25.

Although not illustrated, a 2-bell, 1-valve type device similar to that of the gas-seal type filtration media supplying device 17 is used as the gas-seal type filtration media discharging device 18.

In the dry moving bed type dust collector 8 having the described construction, as the filtration media is supplied to the upper gas-seal type filtration media supplying device 17 by a filtration media conveying means 35, the filtration media is dropped and supplied quantitatively by the suitable control of opening and closing of the conical valves 21,22, and is delivered to the moving bed 13 of the filtration media through the communication passage 13a, while maintaining an effective seal against the leak of the pressure resistant closed vessel 10 to the outside.

In the moving bed 13 of the filtration media, the filtration media 36 which has been supplied previously is accumulated on the lower conical cover member 10b of the vessel 10, so as to temporarily close the lower ends of the inner and outer cylindrical wire screens 12,14. Therefore, the filtration media 36 forms a bed in the space between the inner and outer cylindrical wire screens 12,14. As the gas-seal type filtration media discharging device 18 operates to extract and discharge the bottom portion of the accumulated filtration media, the bed 13 of the filtration media gradually moves toward the bottom side, following the decrease of the filtration media 36. Thus, the bed 13 of the filtration media continuously moves toward the bottom side, and the moving bed 13 of the filtration media is always constituted by new filtration media 36.

The filtration media 36 discharged by the lower gas-seal type filtration media discharging device 18 is regenerated by means of a filtration media cleaning device 37, and is fed again to the upper gas-seal type filtration media supplying device 17 through the filtration media conveying device 35. Thus, the filtration media is circulated for a repeated use.

Meanwhile, the blast furnace gas after the coarse dust removal performed by the preparatory dust collector 7 is delivered to the inside of the inner cylindrical wire screen wire 12 in the vessel 10, through the supplying duct 15. As this gas, after the coarse dust removal, passes through the dust removing passage across the moving bed 13 of the filtration media to the space defined by the inner peripheral surface of the vessel 10, the dusts contained and suspended in the gas are absorbed by the particles of the filtration media 36 amost completely. After this final dust removal, the gas is supplied to the axial flow type top pressure recovery turbine 9, through the discharge duct 16.

Usually, the blast furnace exhaust gas has a pressure of 1.5 to 3.0 Kg/cm$^2$G and contains more than 20% by weight of CO (carbon monoxide). The pressure-resistant construction of the vessel 10, and the gas-seal type constructions of the devices 17, 18 for supplying and discharging filtration media are adopted for preventing the external leak of the gas. This arrangement conveniently permits the installation of the conveying means 35 for the filtration media, screen and other powered equipments at the outside of the system of CO gas, which in turn ensures easier maintenance of these equipments.

In order that the axial flow type top pressure recovery turbine inherently having a high efficiency may be used successfully, it is necessary to limit the dust concentration of the gas supplied to the turbine down to 10 mg/Nm$^3$ or smaller.

It is possible to lower the dust concentration by adopting a low velocity of the gas after the coarse dust removal flowing across the moving bed 13 of the filtration media or, alternatively, adopting a larger thickness of the moving bed 13 of the filtration media. However, as a result of experiments, it has proved that the dust concentration can be reduced down to 10 mg/Nm$^3$ or lower, by adopting a 2-stage dust collection in which the gas after coarse dust removal is made to pass through two successive beds 13 of filtration media, if various filtration conditions such as thicknesses of respective moving beds of the first and second stages, amounts of dusts in respective moving beds 13, velocity of the gas flowing through respective beds 13 are suitably selected.

Figure 5A:
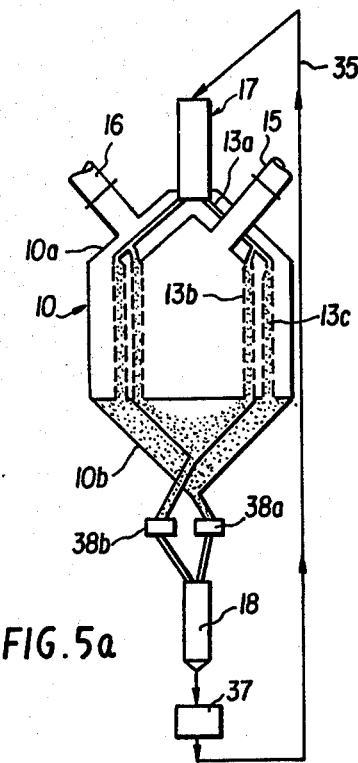
FIG. 5a is a longitudinal sectional view of a second example of the dry moving bed type dust collector in accordance with the present invention.
Figure 5B:
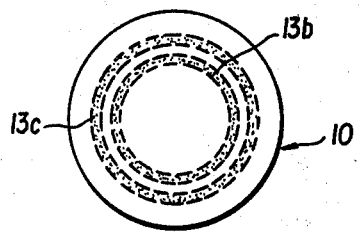
Figure 5C:
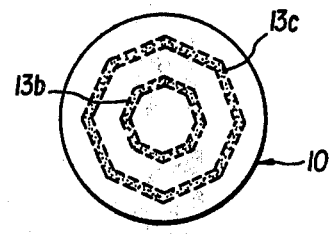

Thus, by arranging two moving beds 13b, 13c of filtration media in the pressure-resistant vessel 10 in the form of concentric circles or polygonal rings, as shown in FIGS. 5a, 5b and 5c, and suitably selecting the ratio of diameters of the inner and outer beds 13b, 13c, it is possible to obtain a suitable ratio of the flow velocities of the gas across the inner and outer beds 13b, 13c, when the gas after the coarse dust removal is made to flow from the inside to the outside in the pressure-resistant vessel 10.

The provision of two moving beds 13b, 13c of the filtration media allows optimization of the thicknesses of respective beds 13b, 13c. At the same time, it is possible to optimize the rates of cut-out of filtration media in both beds 13b, 13c independently of each other by cutting out the filtration media from respective beds 13b, 13c by separate cut-out devices 38a, 38b. By doing so, the amount of dusts in respective beds 13b and 13c are suitably adjusted and optimized, so as to ensure the highest dust collection efficiency.

In the described embodiment, the ducts denoted by reference numerals 15 and 16 are used for supplying the gas after the coarse dust removal and the discharging of the gas after the final dust removal. This arrangement, however, is not exclusive, and the ducts 15 and 16 may be used for the discharge and supply of the gas, respectively. As has been described, according to the invention, there is provided an apparatus for recovering energy or power from blast furnace exhaust gas, characterized by a dry moving bed type dust corrector having a pressure-resistant closed vessel, at least one moving bed of filtration media disposed in said closed vessel, a gas-seal type filtration media supplying device connected to the upper side of the closed vessel 10 and a gas-seal type filtration media discharging device connected to the bottom of the closed vessel, the dry moving bed type dust collector being disposed in the preceding stage to a top pressure recovery turbine, whereby the gas after final dust removal by the dry moving bed type dust collector is delivered to the top pressure recovery turbine.

Thus, according to the invention, the vessel in which the moving bed dust collector is disposed can withstand a pressure of the blast furnace exhaust gas which often reaches a gauge pressure of 1.5 to 3 Kg/cm$^2$ and leaking of the gas to the outside of the system is prevented by the gas-seal type constructions of the devices for supplying and discharging the filtration medium. In addition, it becomes possible to isolate the powered equipment from the system of the top gas which contains 20% or more of CO, so that maintenance of these equipments is considerably facilitated.

At the same time, thanks to the provision of the dry moving bed type dust collector, the temperature of the gas supplied to the top pressure recovery turbine is maintained at a level around 120° C., which is considerably high as compared with that obtained in the conventional system incorporating the wet type dust collector. The use of the dry moving bed type dust collector on the other hand diminishes the pressure drop down to a lower level, so that the pressure recovery efficiency is improved considerably. As a result, it becomes possible to drive an axial flow type top pressure recovering turbine inherently having a high efficiency by the blast furnace exhaust gas, so that the efficiency of the turbine is increased by about 30% or more. Taking into account the difference in efficiency between the centrifugal type turbine and the axial flow type turbine, a remarkable increase of the turbine output is obtained.

Further, since the blast furnace gas after the final dust removal is dry, and since the dust concentration can be reduced to 10 mg/Nm$^3$ or smaller, the turbine blades can stand a semipermanent use, and the cost required for the renewal of the blades can greatly be saved. In addition, the installation cost and the cost for treating the dusts are largely decreased, since the disposal of dusts and drying of the dusts are not necessary.

Obviously, many modifications and variations of the present invention are possible in light of the above teachings. It is therefore to be understood that within the scope of the appended claims the invention may be practiced otherwise than as specifically described herein.

What is claimed as new and desired to be secured by letters patent of the United States is:

1. An apparatus for recovering energy or power from blast furnace exhaust gas, comprising:
    means for removing coarse dust of blast furnace exhaust gas;
    means for removing fine dust of the gas after said coarse dust removal and communicating with said means for removing coarse dust, said means for removing fine dust comprising a dry moving bed type dust collector which includes a pressure resistant closed vessel, at least one bed of filtration media disposed in said vessel so as to form a passage for said final dust removal from said gas after said coarse dust removal, a gas-seal type filtration media supplying device including a gas seal and connected to the top portion of said vessel, a gas seal type filtration media discharging device including a gas seal and connected to the bottom portion of said vessel, and means for recirculating said filtration media, said gas seals maintaining said gas out of said means for recirculating, said dry moving bed type dust collector being disposed in a preceding stagte to a top pressure recovery turbine; and means for recovering energy or power from the gas communicating with said means for removing fine dust;

wherein each of said gas seals comprise at least two valves adapted to prevent said gas from leaking out of said vessel and means for alternatively operating said valves during the supply and discharge of said filtration media from said vessel.

2. The apparatus of claim 1 wherein each of said gas seals further comprise a seal housing having therein an axial array including a cut valve, a damper and at least one conical valve including a filtration media level detecting means, said means for alternatively operating said valves, as well as means for introducing pressurized gas into said housing being actuatable in response to a signal from one of said at least one level detecting means.

3. An apparatus according to claim 1, said filtration media in the pressure-resistant vessel further comprising two or more moving beds arranged in the form of concentric rings.

4. An apparatus according to claim 1, said filtration media in the pressure-resistant vessel further comprising two or more moving beds arranged in the form of polygonal rings.

* * * * *